United States Patent [19]
King et al.

[11] Patent Number: 5,591,690
[45] Date of Patent: Jan. 7, 1997

[54] SELF ASSEMBLED MOLECULAR MONOLAYERS ON HIGH SURFACE AREA MATERIALS AS MOLECULAR GETTERS

[75] Inventors: David E. King, Lakewood; Gregory C. Herdt; Alvin W. Czanderna, both of Denver, all of Colo.

[73] Assignee: Midwest Research Institute, Kansas City, Mo.

[21] Appl. No.: 267,715

[22] Filed: Jun. 29, 1994

[51] Int. Cl.[6] .................................................. B01J 20/22
[52] U.S. Cl. ........................ 502/401; 210/490; 210/483; 210/502.1
[58] Field of Search .................. 502/401, 416; 210/490, 502.1, 506, 483

[56] References Cited

U.S. PATENT DOCUMENTS

| | | | |
|---|---|---|---|
| 4,746,572 | 5/1988 | Glajch et al. | 428/403 |
| 4,929,589 | 5/1990 | Martin et al. | 502/406 |
| 4,957,890 | 9/1990 | Wieserman et al. | 502/4 |
| 4,962,073 | 10/1990 | Martin et al. | 502/4 |
| 4,964,972 | 10/1990 | Sagiv et al. | 204/418 |
| 4,983,566 | 1/1991 | Wieserman et al. | 502/401 |
| 4,994,429 | 2/1991 | Wieserman et al. | 502/401 |
| 5,124,289 | 6/1992 | Martin et al. | 502/4 |
| 5,126,310 | 6/1992 | Golden et al. | 502/417 |
| 5,134,110 | 7/1992 | Sudo et al. | 502/401 |
| 5,145,494 | 9/1992 | Sowinski et al. | 55/74 |
| 5,175,137 | 12/1992 | Golden et al. | 502/417 |

OTHER PUBLICATIONS

Bigelow et al., "Oleophobic Monolayers. I. Films Adsorbed From Solution in Non–polar Liquids" J. Colloid Science 1: 513–538 (1946).

Adamson, Physical Chemistry of Surfaces, Wiley, 1982.

Ulman, "Ultrathin Organic Films: From Langmuir–Blodgett to Self–Assembly" J. Mater. Educ. 11(3): 205–280 (1989).

Ramanathan, Proceedings of the ASHRE/SUEH Conferences IAQ89 p. 33, Apr. 1989.

Ricco et al., "Self–Assembling Monolayers on Saw Devices for Selective Chemical Detection" Technical Digest, Proceedings of the 5th Solid State Sensor and Actuator Workshop, pp. 114–117 (1992).

Ozaki et al., "Infrared Spectroscopic Studies of Single–Monolayer Langmuir–Blodgett Films" Spectroscopy, 8(1): 37–44 (1993).

Sun et al., "Molecular Interactions between Organized, Surface–Confined Monolayers and Vapor–Phase Probe Molecules. 5. Acid–Base Interactions" Langmuir 9: 1775–1780 (1993).

*Primary Examiner*—Glenn A. Caldarola
*Attorney, Agent, or Firm*—Edna M. O'Connor

[57] ABSTRACT

The present invention relates to a gettering material that may be used as a filtration medium to remove pollutants from the environment. The gettering material comprises a high surface area material having a metal surface that chemically bonds n-alkanethiols in an organized manner thereby forming a molecular monolayer over the metal surface. The n-alkanethiols have a free functional group that interacts with the environment thereby binding specific pollutants that may be present. The gettering material may be exposed to streams of air in heating, ventilation, and air conditioning systems or streams of water to remove specific pollutants from either medium.

8 Claims, 7 Drawing Sheets

SELF ASSEMBLED MOLECULAR MONOLAYERS ON HIGH SURFACE AREA MATERIALS AS MOLECULAR GETTERS

CONTRACTUAL ORIGIN OF THE INVENTION

The United States Government has rights in this invention under Contract No. DE-AC0283CH10093 between the U.S. Department of Energy and the National Renewable Energy Laboratory, a Division of Midwest Research Institute.

BACKGROUND OF THE INVENTION

1. Field of the Invention

The present invention relates generally to getters or filtration media for improved removal of pollutants from the environment and more particularly to high surface area materials having functional molecular monolayers assembled thereon.

2. Description of the Prior Art

Heating, ventilation, and air conditioning (HVAC) systems are installed in modern buildings to enhance comfort. Those systems not only provide warm or cool air, as needed to maintain room temperature within desired ranges, but also supply fresh air to dilute and replace ambient room air that becomes polluted by human habitation and other sources, such as chemical release from pressed woods, carpets, paint, copy machines, and the like. An increased awareness of chemical pollutants in the environment has resulted in the critical evaluation of air quality in commercial, residential, and industrial structures. Incidents of sick-building syndrome and reports of multiple chemical sensitivity (MCS) as result of exposure to common indoor air pollutants has resulted in action at the federal government level. Current standards of the American Society of Heating, Refrigerating and Air-Conditioning Engineers (ASHRAE) set in 1989 require a minimum fresh air ventilation rate of 7.1 liters/second/person (15 cfm/person) for general building and 9.4 liters/second/person (20 cfm/person) for office buildings.

Adequate exhausting of pollutants for a room or building is necessary and is accomplished by diluting the pollutants inside with fresh air from the outside, while drawing some air out of the room through a return duct. Increasing the air exchange rate results in a dramatic drop in the energy efficiency of buildings. This is reflected in increased energy demands and thus operating costs. Consequently, it is necessary to achieve a greater degree of removal and isolation of chemical pollutants without resorting to large air volume exchanges that involve increased energy demands and high operating costs.

Positioning a filtration device directly in the path of the air flow prior to introducing or injecting air into a room through a duct outlet has been found to be a reasonably effective way to achieve the removal of pollutants. However, there is still a need for substantial further improvement.

There have been some apparatus and methods developed for the removal of pollutants from both, moving streams of air and water. For example, the standard state-of-the-art filtration medium is high surface area (HSA) activated carbon. Many different types of activated carbons with varied internal pore sizes, surface areas, and active surface sites are commercially available. Activated carbons are extensively used to remove a variety of pollutants from both air and water systems, as discussed by Adamson, *Physical Chemistry of Surfaces*, Wiley, 1982. However as discussed by Ramanathan, *Proceedings of the ASHRE/SOEH Conferences IAQ89*, p. 33, April 1989, a disadvantage of activated carbon is that although it is capable of reducing high concentrations of many common indoor pollutants it becomes increasingly ineffective as the concentration of the pollutant drops. Even with surface areas exceeding 1000 $m_2/g$, activated carbon tends to show very early breakthrough behavior in normal size filter beds requiring many air passes to retain its effectiveness. If improvements were made at the molecular level of filtration media, for trapping pollutants present at low levels, indoor air quality would be vastly improved while maintaining the energy efficiency of the building.

SUMMARY OF THE INVENTION

Accordingly, it is a general object of this invention to provide a highly sensitive gettering material.

A more specific object of the present invention is to introduce the gettering material of the present invention into an air or water stream thus filtering out pollutants.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described therein, the composition of this invention may comprise forming an organized molecular monolayer over the surface of a material having a high surface area, wherein the organized molecular monolayer is comprised of long chain organic molecules having functional groups at both ends.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention. In the Drawings.

DETAILED DESCRIPTION OF THE PREFERRED EMBODIMENTS

Figure 1:
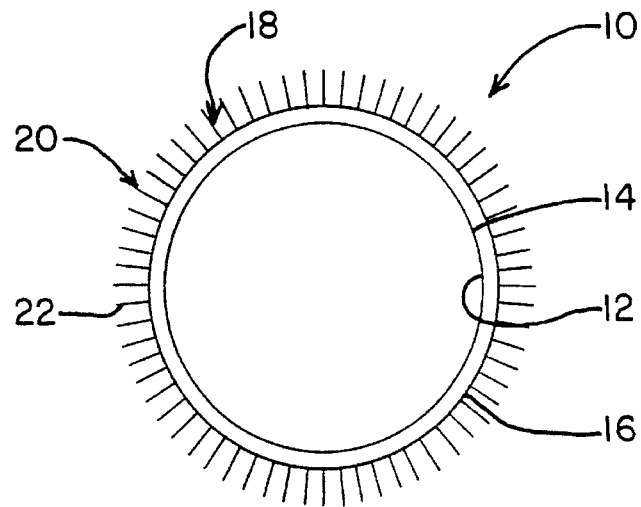
FIG. 1 is an illustration of a metal coated particle having a monolayer of an n-alkanethiol formed thereon.
Figure 1A:
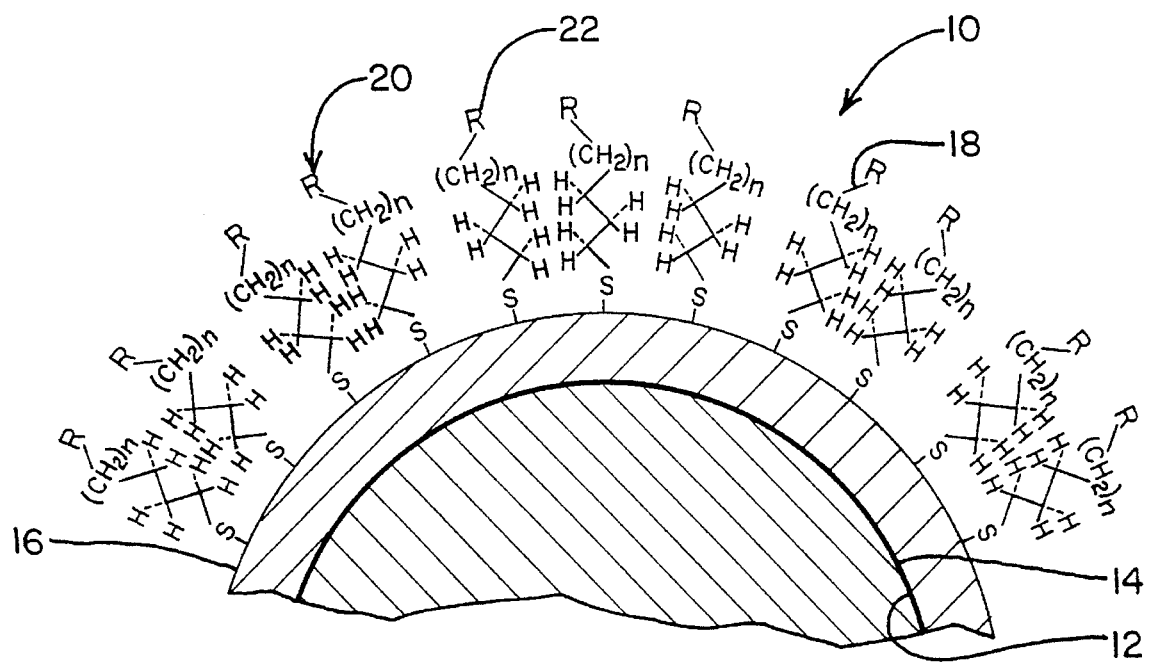
FIG. 1a is a cross-sectional schematic representation at the molecular level of the material shown in FIG. 1.

The getting material 10 according to the present invention is best seen in FIGS. 1 and 1a. The gettering material 10 is comprised of a high surface area material 12, such as activated carbon, silica gel, titanium oxide, and other metal oxides in general, metal powders, zeolites and aerogels, having deposited on the surface 14 of material 12 a thin metal film 16 having an ordered crystalline lattice to which individual n-alkanethiols are adsorbed forming an organized molecular monolayer 18. The surface 20 of molecular monolayer 18 is comprised of terminal functional groups 22 that are selected so they can react with and bind specific pollutants in air or liquid environments. In use, an air or liquid stream is flowed over the surface of gettering material 10 and pollutants found within the stream react with and are adsorbed to molecular monolayer 18, thus being effectively removed from the stream.

A thin layer of chemically reduced metal, such as pure silver or gold, is precipitated onto a sensitized surface 14 of material 12, such as a particle of titanium dioxide, thereby forming metal film 16 having a uniform thickness of about 3 angstroms. This may be accomplished by a common commercial process known as a wet chemical electroless process. Following the deposition of metal film 16, material 12 is immersed in a solution of an n-alkanethiol for a few minutes to sixteen hours, preferably the solution is a 5 mM ethanolic solution of $SH(CH_2)_n$—R, n in the formula is an integer of preferably 5 or greater while R in the formula is a specific functional group that is chosen to react with a specific pollutant. Molecular monolayer 18 forms spontaneously on the metal surface 14. The sulfur group of the n-alkanethiol chemically bonds to the surface 14 forming a very dense, impermeable, molecular monolayer 18. A cross-sectional schematic representation of the gettering material 10 at the molecular level is shown in FIG. 1a.

From the energetics point of view, a self-assembling n-alkanethiol or surfactant molecule can be divided into three parts. The first part is the head group or in the present invention an SH group that provides the most exothermic process, i.e. chemisorption on the metal surface 14. The very strong molecular-substrate interactions result in an apparent pinning of the chemical bond. This can be a covalent Ag—S bond in the case of alkanethiols on silver; or a covalent, but slightly polar, Au—S bond in the case of alkanethiols on gold. As a result of the exothermic head group-substrate interactions, molecules try to occupy every available binding site on the surface of the metal, and in this process they push together molecules that have already adsorbed. It is this spontaneous molecular adsorption that brings molecules close enough together and allows for the short-range dispersive, London-type, Van der Waals forces to become important. The second molecular part is the alkyl chain, and the energies associated with its interchain Van der Waals interactions are at the order of a few (<10) kcal/mol (exothermic). It is clear, however, that while interchain interactions are important, the first and most important process is chemisorption. The third molecular part is the terminal functional group, which is chosen to interact with specific contaminants.

Following the formation of molecular monolayer 18 the gettering material 10 is rinsed with ethanol to remove the residual n-alkanethiol solution and dried.

Figure 2:
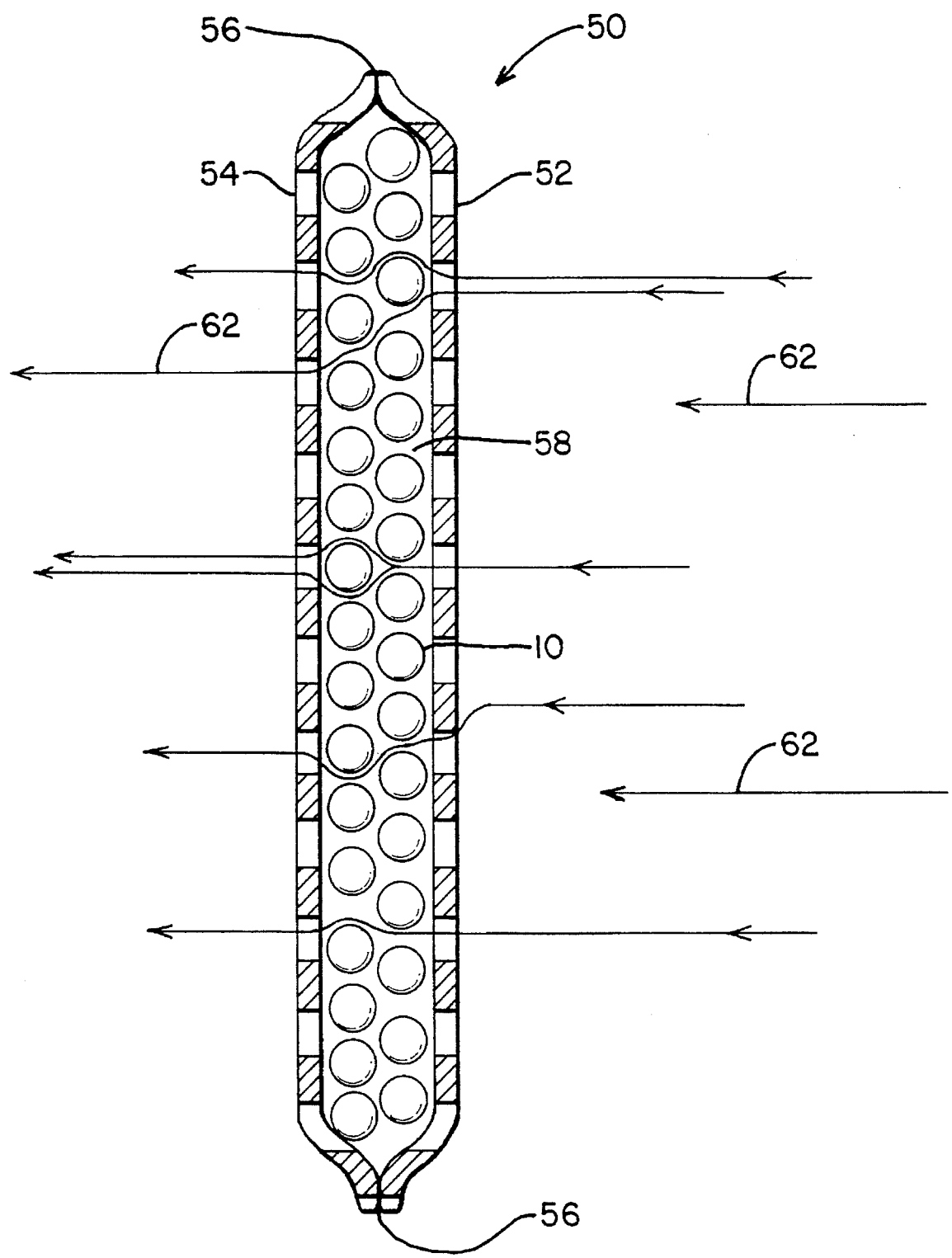
FIG. 2 is a cross-sectional view of a filtration device constructed with the gettering material of the present invention held within a wire mesh.
Figure 3:
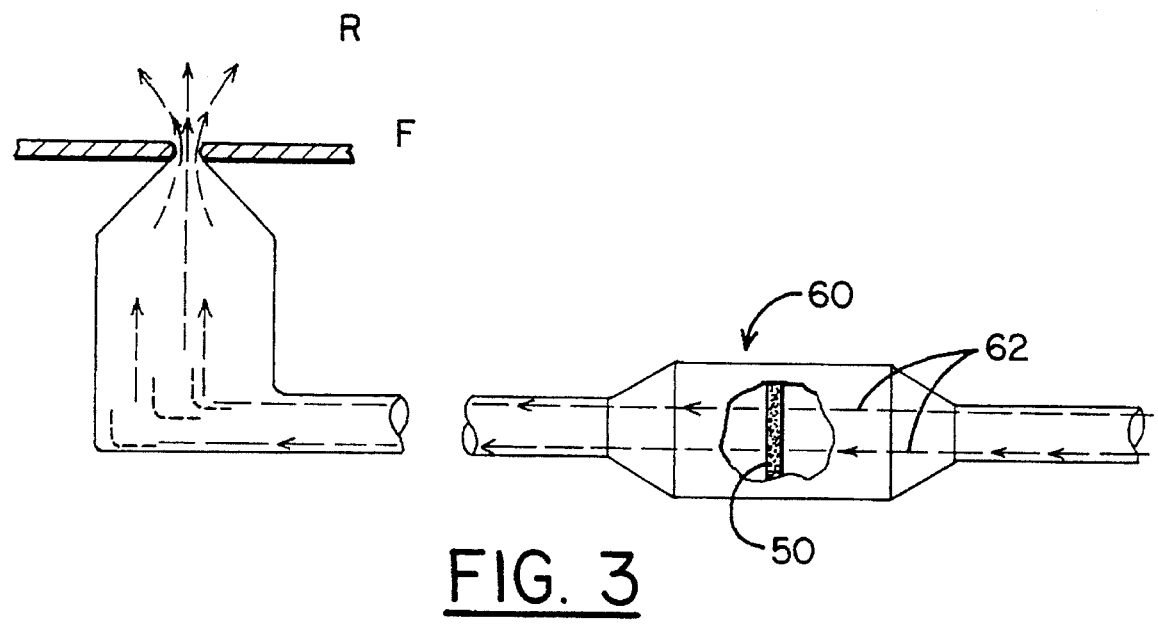
FIG. 3 is a schematic representation of an air filtration system of the present invention in side elevation view as installed in a ventilation duct.

In use, a filtration 50 device or filter, as shown in FIG. 2, is assembled wherein said filter 50 comprises two permeable outer sheets or walls 52, 54 positioned in parallel relation to each other. The seams around the edges of the filter 50 where the two permeable outer sheets or walls 52, 54 meet are sealed, preferably by welding, as shown at 56. The interior chamber 58 enclosed by the outer sheets or walls 52, 54 is filled with gettering material 10 prior to being completely sealed. Filter 50 is then inserted into an air delivery duct 60 as shown in FIG. 3. Pollutants contained in air stream 62, which is being delivered into an enclosure, such as a room R in a building are removed as air stream 62 passes through filter 50.

In a second embodiment (not shown) expanded metal carbon and metal plated ceramic foams purchased from Energy Research and Generation, Inc., Oakland, Calif., may be directly immersed in a 5 mM ethanolic solution of an n-alkanethiol such as 11-mercaptoundecanoic acid thereby forming a molecular monolayer over the surface of the expanded metal. Following the formation of the molecular monolayer the gettering material is rinsed with ethanol to remove the residual n-alkanethiol solution and dried. The gettering material may then be placed directly within a duct as discussed in the preferred embodiment.

Figure 4:
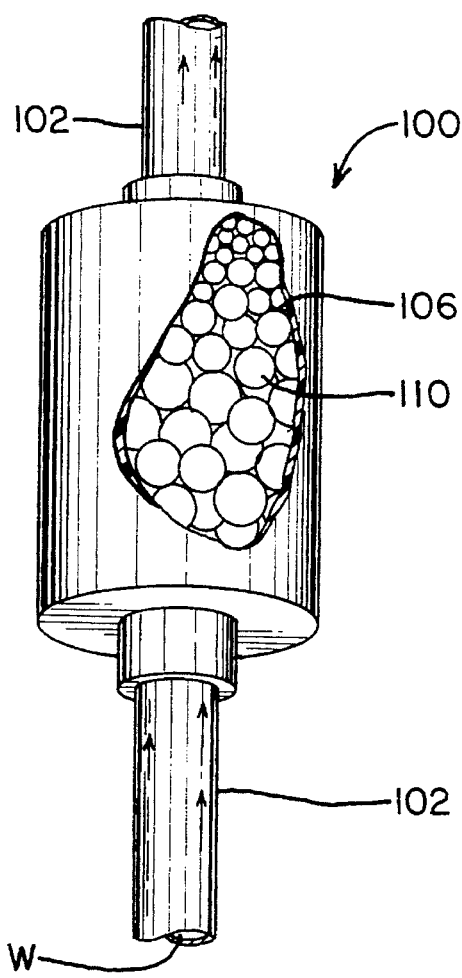
FIG. 4 is a perspective view of a water filtration system of the present invention installed in a water pipe.

In a third embodiment, shown in FIG. 4, a filtration bed 100 may be prepared and inserted within a water pipe 102. Water W flowing through filtration bed 100 will come in contact with the functional groups (not shown) that comprise the active surface 106 of the molecular monolayer (not shown) of gettering material 110. Any pollutants within the water W that the functional groups have been designed to react with will be tightly adsorbed and thus removed from the water W.

EXAMPLES

The following example demonstrates the efficacy of using a molecular monolayer, formed over a high surface area material, having the general formula $SH—(CH_2)_n—R$ wherein n is an integer of 5 or greater, and R is a functional group, as a gettering device for pollutants in air and liquid streams.

X-ray photoelectron spectroscopy (XPS) analysis was conducted with Mg x-radiation, at a power of 240 watts (12 KV, 20 mA) using a Leybold-Heraeus surface analytical system model number (LHS-10) manufactured by Leybold-Heraeus, Cologne, Germany. The base pressure of the sample chamber during analysis was typically $2 \times 10^{-8}$ torr. Fourier Transform Infrared (FTIR) analysis were conducted on powder samples of titania in a DR-FTIR (Diffuse Reflectance FTIR) attachment, model number DRA-N06 manufactured by Harrick Company, in the Nicolet model 800 FTIR spectrometer manufactured by Nicolet Analytical Instruments, Madison Wisconsin. The DR technique is specialized for bulk powder samples.

Small 1–5 micron spherical particles of titanium dioxide having a surface area of $10 m^2/g$ (Aldrich Chemical Co.) were silvered by direct reduction of silver nitrate on the titania surface. The silver content of the material was 0.3% by weight by Flame Atomic Absorption analysis. Assuming a complete and uniform coverage, this corresponds to 3 Angstroms of silver on the surface of the titania, or about 1 monolayer. However, it is more likely that less of the entire surface area is covered by more than this thickness. A sample (about 2.5 g) of this material was incubated with a 5 mM ethanolic solution of 11-mercaptoundecanoic acid,

[SH(CH$_2$)$_{10}$COOH], (MUA) for 10 hours for self assembly of a molecular monolayer.

The point of attachment to the silver surface of this long chain molecule is the thiol (SH) functional group, which leaves the COOH, (acid) group as the surface functional group. The resulting MUA/Ag/TiO$_2$ material was centrifuged with two volumes of fresh ethanol three times to assure complete removal of any unassembled MUA. The MUA/Ag/TiO$_2$ material was resuspended in fresh ethanol and sonicated prior to each centrifugation. The MUA/Ag/TiO$_2$ material was stored damp with ethanol and dried immediately before use under dry air. The resulting x-ray photoelectron spectroscopy (XPS) and Fourier Transform Infrared (FTIR) analysis show the presence of the acid molecules at a level consistent with a monolayer assembly.

I. Analysis of Gettering Material Prior to Exposure to a Pollutant

XPS Analysis:

Quantitative XPS data, shown below in Table 1, follows the surface atomic percent composition before and after assembly of the MUA molecular monolayer onto silver supported on titania.

TABLE I

| Element | Ag/TiO$_2$ | MUA/Ag/TiO$_2$ | Difference |
|---|---|---|---|
| Sulfur | — | 1.9 | +1.9 |
| Carbon | 81.1 | 84.7 | +3.6 |
| Silver | 2.1 | 1.1 | −1.0 |
| Titanium | 3 | 2.3 | −0.7 |
| Oxygen | 13.8 | 10.0 | −3.8 |

The loss in silver XPS intensity, nearly 50%, after the assembly of the molecular monolayer onto the silver loaded high surface area material indicates that the majority of the MUA has assembled specifically onto the exposed silver surface. The small increase in surface carbon concentration and the appearance of a sulfur peak indicates the assembly of a MUA monolayer film on the exposed silver surface of the modified high surface area material. This is consistent with the known chemistry of thiols assembling onto smooth silver surfaces.

Figure 5:
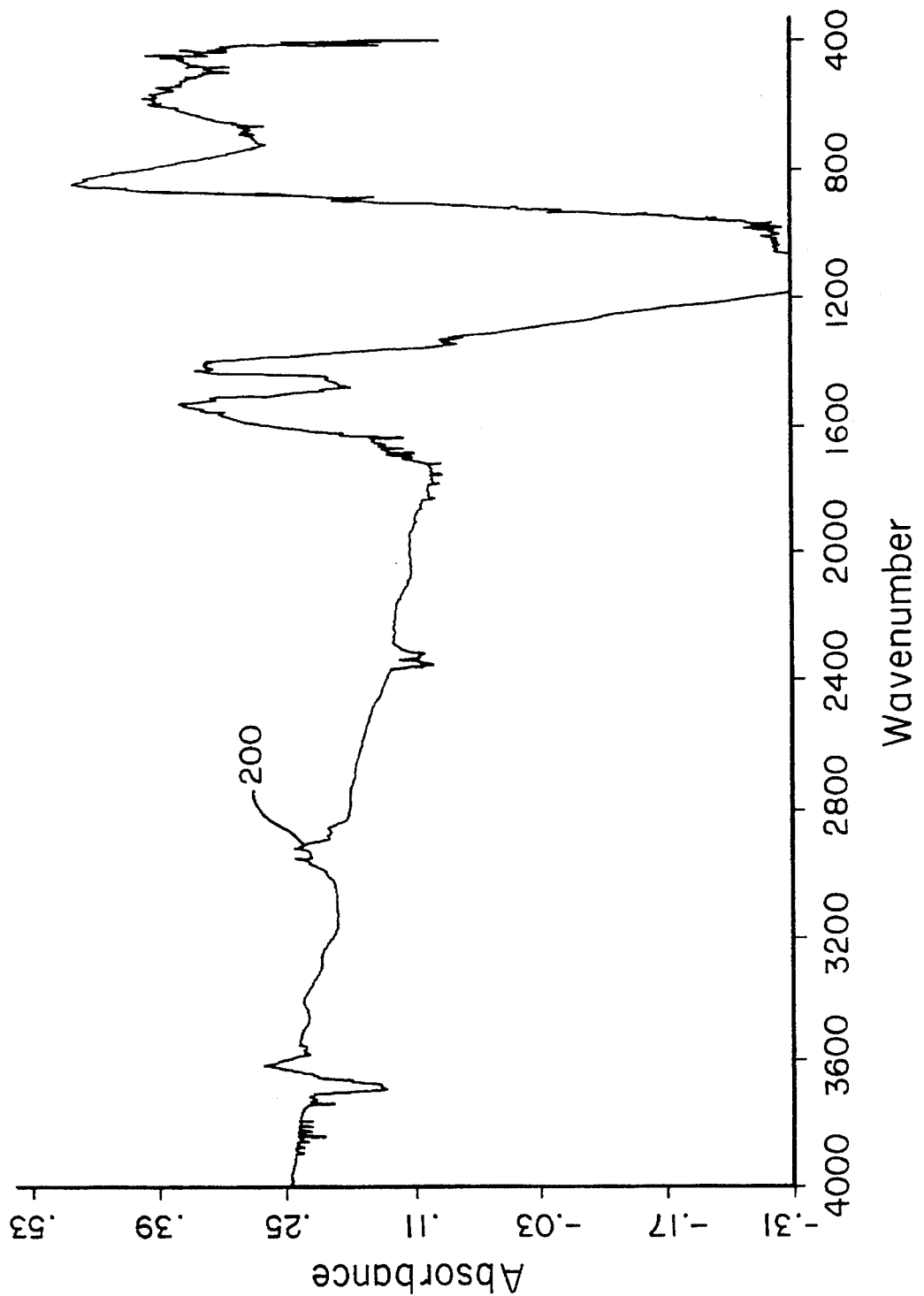
FIG. 5 is a FTIR spectrum of a silver coated titania substrate.
Figure 6:
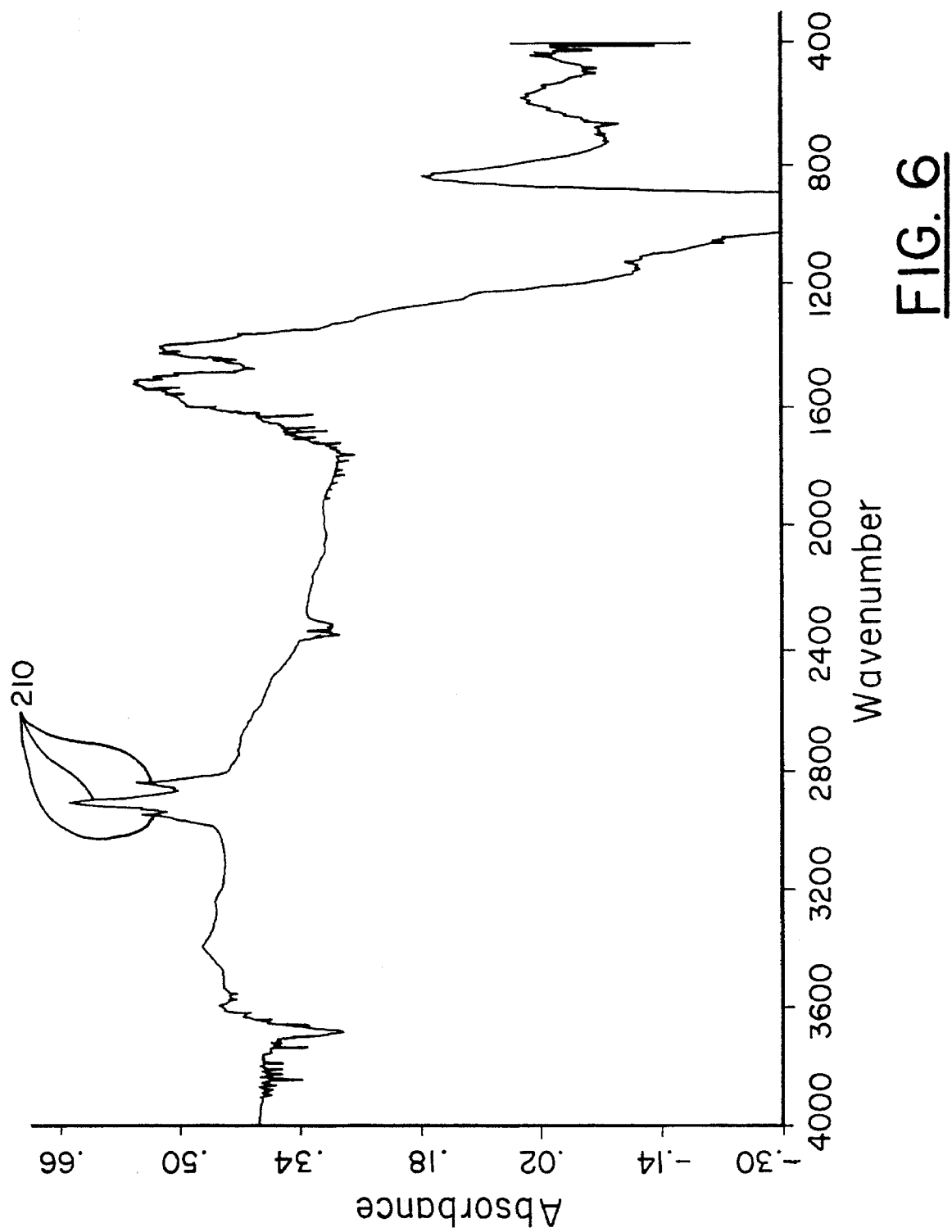
FIG. 6 is an FTIR spectrum of a silver coated titania substrate having an n-alkanethiol formed thereon.

FTIR Analysis:

Analysis with DR-FTIR of the silver coated titania shows that there is initially some hydrocarbon, represented by peaks 200 above 2900 cm$^{-1}$ shown in FIG. 5, present on the silver coated titania, as expected from atmospheric exposure. Subsequent to incubating the silver coated titania with MUA, the hydrocarbon peaks 210 of spectrum 215 changes and increases in intensity as shown in FIG. 6. Peak positions in a system such as this have not been defined, however the peak intensities and positions are consistent with values for molecular monolayers assembled on smooth silver surfaces.

II. Analysis of Material Gettering Exposed to a Pollutant

XPS Analysis:

The high surface area gettering material of the present invention was exposed to approximately 30 ppm (parts per million) of aniline (an aromatic primary amine) vapor in the high-pressure cell of the LHS 10 system (in a very clean and controlled environment), at about 1×10$^{-2}$ torr of aniline, in the presence of water vapor. The LHS 10 system allows XPS analysis of the sample prior to aniline exposure and subsequent analysis of the exposed sample without bringing the sample into the room atmosphere or contact with any other unchoosen gas or vapor set. After aniline exposure the sample was allowed to sit under dynamic vacuum conditions in the analysis chamber until the base pressure was in the low 10$^{-8}$ torr region. Any aniline that was physisorbed rather than chemisorbed would be expected to be rapidly pumped away under these conditions.

Table II, below, provides quantitative XPS data of the surface atomic percent composition before and after exposure of the MUA molecular monolayer assembled on silver supported on titania to aniline.

TABLE II

| ELEMENT | MUA/AG/TiO$_2$ | Aniline Exposed | Differences |
|---|---|---|---|
| Carbon | 84.7 | 86.0 | +1.3 |
| Silver | 1.1 | 1.2 | −0.1 |
| Titanium | 2.3 | 1.8 | −0.5 |
| Oxygen | 10.0 | 8.6 | −1.4 |
| Nitrogen | — | 2.5 | +2.5 |

The aniline exposure resulted in a further increase in the carbon content on the surface of the MUA/Ag/TiO$_2$ material. The low concentration of surface nitrogen, 2.5%, suggests that the acid group has reacted with (chemisorbed) the aniline (a basic amine). The surface element atomic compositions are calculated from the entire XPS analysis sampling depth of nearly 50 angstroms. Since the aniline resides only on the surface (under 10 angstroms, assuming no more than a monolayer of aniline) this 2.5% is an appreciable coverage. The sulfur atomic composition, as discussed above in Table I, of the unexposed gettering material is about 2%. This is very close to the value of 2.5% surface nitrogen that was determined from the aniline exposed sample. Since there is one sulfur atom and one acid group per MUA chain, this one to one correspondence is consistent with each surface COOH site occupied by an aniline molecule.

Figure 7:
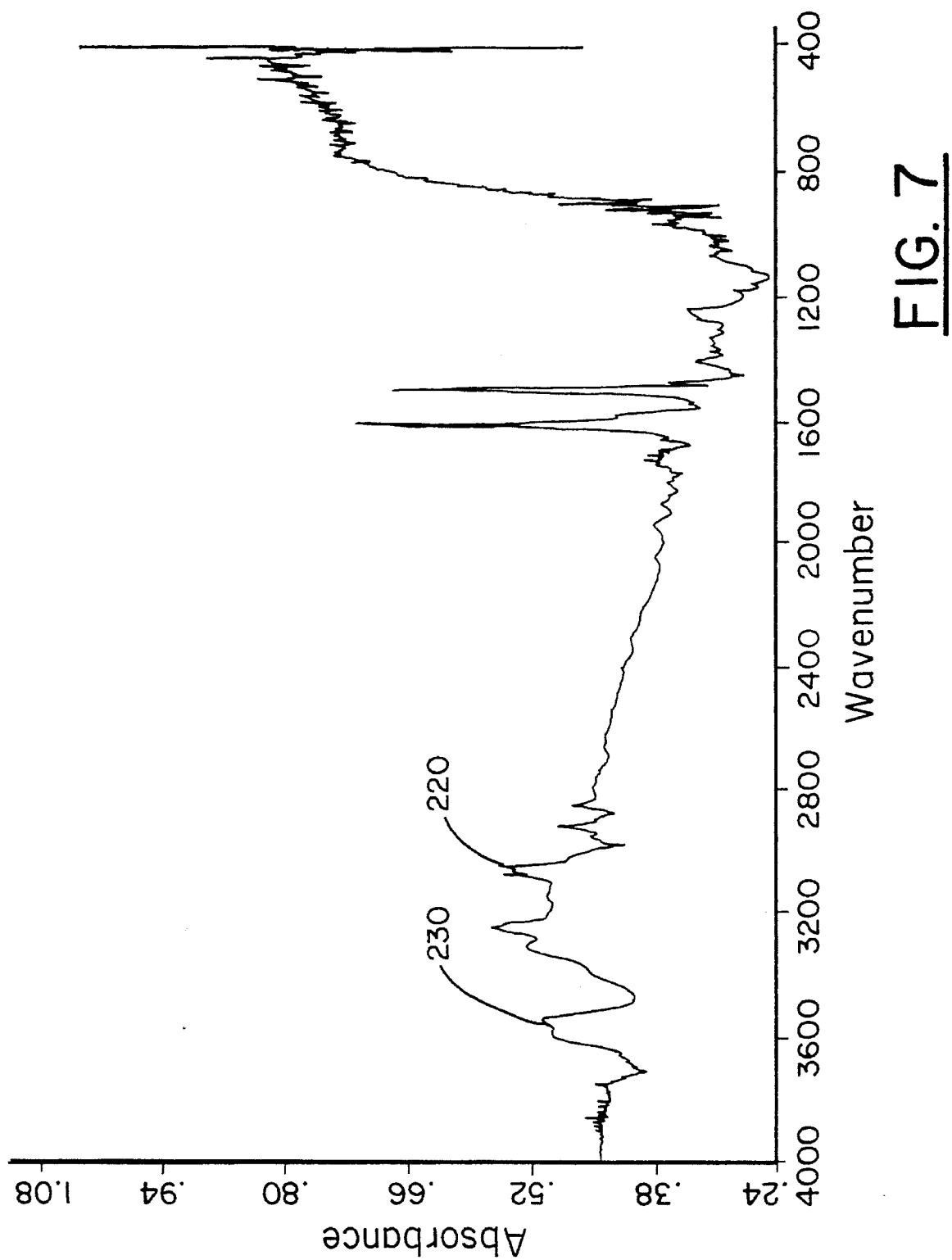
FIG. 7 is an FTIR spectrum of a silver coated titania substrate having an n-alkanethiol formed thereon exposed to aniline.
Figure 8:
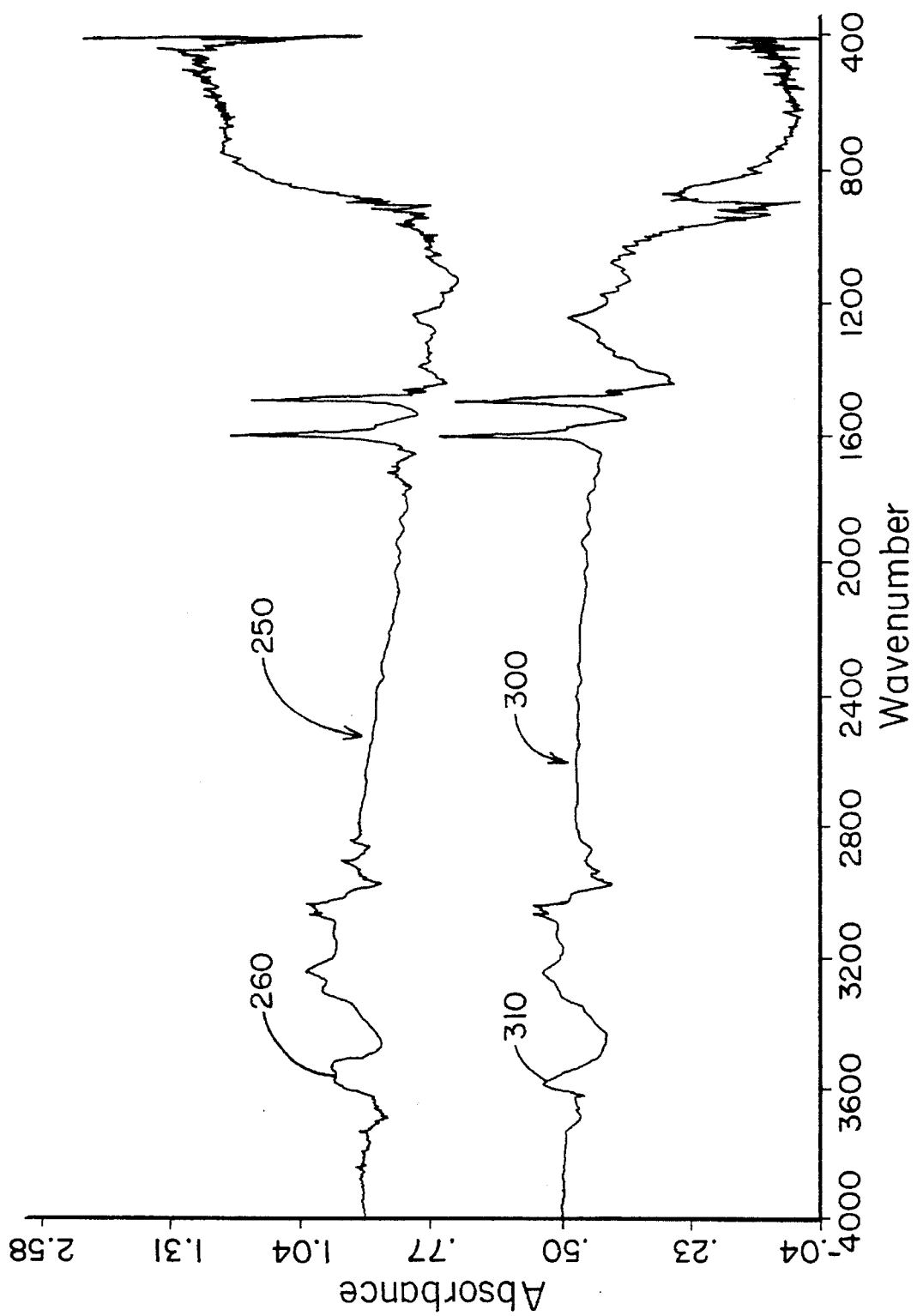
FIG. 8 is the FTIR spectrum of FIG. 7 compared to an FTIR spectrum of a silver coated titania substrate exposed to aniline.

FTIR Analysis:

A sample of the MUA/Ag/TiO$_2$ material was exposed to aniline vapor, at about 30 ppm, in a closed 250 ml flask, without contacting the liquid, for 23 hours at room temperature. Two microliters of aniline were introduced into the bottom of the flask, with the MUA/Ag/TiO$_2$ supported on a glass fritted filter in the flask. The exposed MUA/Ag/TiO$_2$ material was analyzed with DR-FTIR. The FTIR spectrum, shown in FIG. 7, was collected after 2 hours of dry air purge in the FTIR chamber. As shown in FIG. 7, the aromatic CH features, represented by peaks 220, at 3000 cm$^{31\ 1}$ are clearly visible in the aniline exposed sample, and a new peak 230 appears at about 3550 cm$^{-1}$ indicates the presence of the carboxyl salt of aniline and the surface bound MUA molecules. This is indicative of the MUA surface COOH groups with aniline. A control experiment using silver coated titania, after being exposed to aniline vapor, as above, for 72 hours, displayed a spectrum 300 having a peak 310 at about 3600 cm$^{-1}$ consistent with a physisorbed aniline, as shown in FIG. 8. The spectrum of the MUA system 250 also shown in FIG. 8, clearly shows a different peak 260 for the chemisorbed carboxyl aniline salt (NH$^{3+}$) at about 3550 cm$^{-1}$. The infrared absorbance intensity of the chemisorbed aniline is far less for the physisorbed species, and is consistent with the presence of a monolayer of aniline bonded to the MUA/Ag/TiO$_2$ material.

The XPS and FTIR data are consistent with the formation of an ordered molecular monolayer on the surface of silver (metal) coated titania, and the subsequent reaction with an amine pollutant molecule, aniline.

The embodiments of the invention in which an exclusive property or privilege is claimed are defined as follows:

1. A filter for the removal of pollutants from a specific environment comprising:

a substrate having a metal surface; and a molecular monolayer formed on said metal surface; wherein said molecular monolayer comprises a compound having the general formula $SH(CH_2)_n\text{--}R$, wherein n is an integer of 5 or greater and R is a specific functional group that is chosen to react with a specific pollutant, and a permeable container to hold said substrate having said molecular monolayer formed on said surface.

2. The filter of claim 1, wherein said functional group is carboxylic acid.

3. The filter of claim 1, wherein said metal surface is deposited onto the substrate.

4. A filter for removal of pollutants from a specific environment comprising:

a substrate having a metal surface; and a molecular monolayer formed on said metal surface; wherein said molecular monolayer comprises a compound having the general formula $SH(CH_2)_n\text{--}R$, wherein n is an integer of 5 greater and R is a specific functional group that is chosen to react with a specific pollutant, wherein said metal surface is deposited onto the substrate and said substrate is activated charcoal.

5. The filter of claim 3, wherein said metal is silver.

6. A filter for the removal of pollutants from a specific environment comprising:

a substrate having a metal surface wherein said substrate is a metal powder;

a molecular monolayer formed on said metal surface; wherein said molecular monolayer comprises a compound having the general formula $SH(CH_2)_n\text{--}R$, wherein n is an integer of 5 or greater and R is a specific functional group that is chosen to react with a specific pollutant.

7. A filter for the removal of pollutants from a specific environment comprising:

a substrate having a metal surface wherein said substrate is a metal oxide;

a molecular monolayer formed on said metal surface; wherein said molecular monolayer comprises a compound having the general formula $SH(CH_2)_n\text{--}R$, wherein n is an integer of 5 or greater and R is a specific functional group that is chosen to react with a specific pollutant.

8. The filter claim 7, wherein said metal oxide is titanium oxide.

* * * * *